(12) United States Patent
Kappel et al.

(10) Patent No.: US 11,733,355 B2
(45) Date of Patent: Aug. 22, 2023

(54) OPTICAL SENSOR MODULE AND METHOD FOR MANUFACTURING AN OPTICAL SENSOR MODULE FOR TIME-OF-FLIGHT MEASUREMENT

(71) Applicant: ams AG, Premstätten (AT)

(72) Inventors: Robert Kappel, Wettmannstätten (AT); Mario Manninger, Premstätten (AT); Todd Bishop, Denton, TX (US)

(73) Assignee: AMS AG, Premstaetten (AT)

( * ) Notice: Subject to any disclaimer, the term of this patent is extended or adjusted under 35 U.S.C. 154(b) by 1172 days.

(21) Appl. No.: 16/326,755

(22) PCT Filed: Aug. 24, 2017

(86) PCT No.: PCT/EP2017/071364
§ 371 (c)(1),
(2) Date: Feb. 20, 2019

(87) PCT Pub. No.: WO2018/041720
PCT Pub. Date: Mar. 8, 2018

(65) Prior Publication Data
US 2019/0187254 A1      Jun. 20, 2019

Related U.S. Application Data

(60) Provisional application No. 62/382,377, filed on Sep. 1, 2016.

(30) Foreign Application Priority Data

Sep. 21, 2016   (EP) ..................................... 16189924

(51) Int. Cl.
*G01S 7/481*      (2006.01)
*G01S 17/08*      (2006.01)
(Continued)

(52) U.S. Cl.
CPC .......... *G01S 7/4813* (2013.01); *G01S 7/4808* (2013.01); *G01S 7/497* (2013.01); *G01S 17/08* (2013.01)

(58) Field of Classification Search
CPC ........ G01S 7/027; G01S 7/4808; G01S 7/481; G01S 7/4813; G01S 7/4816; G01S 7/484;
(Continued)

(56) References Cited

U.S. PATENT DOCUMENTS 6,509,958 B2 * 1/2003 Pierenkemper ....... G01S 7/4817
                                                                  356/5.01
6,624,418 B1 * 9/2003 Braunwarth ........... G01N 21/15
                                                                  250/341.1
(Continued)

FOREIGN PATENT DOCUMENTS

CN          102265137 A         11/2011
EP            3091369 B1 *    7/2018  ............. G01S 17/42
(Continued)

OTHER PUBLICATIONS

European Patent Office, International Search Report for PCT/EP2017/071364, dated Jan. 15, 2018.
(Continued)

*Primary Examiner* — Yuqing Xiao
*Assistant Examiner* — Benjamin Richard Hebert
(74) *Attorney, Agent, or Firm* — MH2 Technology Law Group LLP

(57) ABSTRACT

An optical sensor module for time-of-flight measurement comprises an optical emitter, a main detector and a reference detector which are arranged in or on a carrier. An opaque housing of the optical sensor module has a first chamber and a second chamber which are separated by a light barrier. The housing has a cover section and is arranged on the carrier such that the optical emitter is located inside the first
(Continued)

chamber, the main detector is located inside the second chamber and the reference detector is located outside the first chamber. Furthermore, a main surface of the cover section is positioned opposite the carrier. The optical emitter is arranged and configured to emit light through a first aperture in the cover section, and the main detector is arranged and configured to detect light entering the second chamber through a second aperture in the cover section. A reference path is established between the optical emitter and the reference detector inside the optical sensor module, and confined by the main surface of the cover section and the carrier. Additionally, a method for manufacturing an optical sensor module for time-of-flight measurement is presented.

16 Claims, 5 Drawing Sheets

(51) Int. Cl.
*G01S 7/497* (2006.01)
*G01S 7/48* (2006.01)

(58) Field of Classification Search
CPC ........ G01S 7/486; G01S 7/497; G01S 17/003; G01S 17/02; G01S 17/08; G01S 17/42
See application file for complete search history.

(56) References Cited

U.S. PATENT DOCUMENTS

| | | | |
|---|---|---|---|
| 10,147,834 B2* | 12/2018 | Herard | H01L 31/18 |
| 2003/0218737 A1* | 11/2003 | Gogol | G01S 17/10 |
| | | | 356/3.03 |
| 2004/0085526 A1* | 5/2004 | Gogol | G01S 17/10 |
| | | | 356/4.01 |
| 2010/0314532 A1* | 12/2010 | Chin | G01D 5/34715 |
| | | | 250/231.13 |
| 2011/0313635 A1 | 12/2011 | Blanc et al. | |
| 2012/0290255 A1* | 11/2012 | Kelkar | H01L 25/167 |
| | | | 257/E33.076 |
| 2013/0079068 A1 | 3/2013 | Coffy et al. | |
| 2013/0099101 A1* | 4/2013 | Campbell | G01S 17/10 |
| | | | 250/208.2 |
| 2013/0300838 A1 | 11/2013 | Borowski | |
| 2014/0084308 A1* | 3/2014 | Wong | G01S 7/4813 |
| | | | 257/E33.077 |
| 2015/0083900 A1* | 3/2015 | Caley | G01S 7/497 |
| | | | 250/221 |
| 2016/0033644 A1 | 2/2016 | Moore | |
| 2017/0038459 A1* | 2/2017 | Kubacki | G01J 1/0411 |
| 2017/0110618 A1* | 4/2017 | Herard | G01S 7/481 |
| 2018/0006182 A1* | 1/2018 | Renard | G01S 7/4813 |

FOREIGN PATENT DOCUMENTS

| | | |
|---|---|---|
| WO | 2015/136099 | 9/2015 |
| WO | WO 2017/211742 A1 | 12/2017 |

OTHER PUBLICATIONS

Office Action issued in European Application No. 16189924.0, dated Jan. 23, 2020, 6 pages.

Chinese First Office Action and Search Report dated Sep. 6, 2022, for corresponding Chinese Application No. 201780053737.1, including an English Translation, 16 pages.

* cited by examiner

OPTICAL SENSOR MODULE AND METHOD FOR MANUFACTURING AN OPTICAL SENSOR MODULE FOR TIME-OF-FLIGHT MEASUREMENT

This invention relates to an optical sensor module and to a method for manufacturing an optical sensor module, e.g. for time-of-flight measurements.

BACKGROUND OF THE INVENTION

Optical sensors for time-of-flight, TOF, measurement find application in various distance measurement systems. Examples include camera autofocus assistance systems, parking assistance systems for vehicles and control or monitoring systems for self-driving vehicles. TOF sensors are often implemented into dedicated sensor modules comprising highly adapted sensor packages. For example, TOF sensor modules typically require an optical reference path and a measurement path in order to accurately detect a time stamp of the light emission and arrival of reflected light, such as a laser beam. Optical sensor modules for TOF often comprise single or arrays of single-photon avalanche diodes, SPAD, as their main optical detector. To achieve high time measurement precision a reference SPAD, or reference SPAD array, can be used in addition to the measurement SPAD.

The combination of main and reference detectors may support a double-differential measurement principle. A time delay can be measured between an electrical signal of a light source driver and the reference detector as well as a delay between an electrical signal of the light source driver and the main measurement detector. Subtracting both results leads to a time-of-flight value and tends to cancel out systematic errors of the response time of the driver circuit, the light source and readout circuitry.

The double-differential measurement principle in TOF sensors is supported by optically separating the reference detector from the main detector in order to prevent detection of a crosstalk based reference signal at the measurement detector. It is often desirable to keep the sensor module compact and reduce its form factor. On the other side, however, the design of optical sensor modules should not trade compact dimensions for accuracy, which depends also on defined reference paths and reduction of unwanted optical crosstalk. Thus, there is a need in the art for alternate packaging concepts which address these issues.

SUMMARY OF THE INVENTION

It is to be understood that any feature described in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the optical sensor module and the method for manufacturing an optical sensor module as defined in the accompanying claims.

In at least one embodiment an optical sensor module for time-of-flight measurement comprises an optical emitter, a main detector and a reference detector arranged in or on the carrier.

For example, the optical emitter comprises a light source with emission in the visible, infrared or ultraviolet spectrum, such as a laser, laser diode or light emitting diode. Correspondingly, the main detector and the reference detector are sensitive to radiation emitted by the optical emitter. Examples of detectors include photodiodes, avalanche diodes, such as single-photon avalanche diodes (SPAD), or any other type of CMOS photo sensor. Furthermore, the detector may be arranged in a linear or two-dimensional array, such as a SPAD array, for example.

Typically, the optical emitter, main and reference detectors are integrated components, or part of an integrated circuit, and may be supplemented by additional electronic circuitry for interfacing and operating the same. The carrier may be part of the housing and comprising the same material, or a printed circuit board or substrate, for example. Some light sources may be equipped with a light source driver which can be connected externally, or be integrated into an integrated circuit, as part of additional electronic circuitry for interfacing and operating mentioned above.

The optical sensor module further comprises an opaque housing. The housing has a first chamber and a second chamber which are separated by a light barrier. The housing further comprises a cover section with a main surface. Optionally, the housing may be complemented with a cover plate arranged on the main surface. The cover plate could, however, be part of a device into which the optical sensor module may be implemented, a mobile phone or tablet, for example.

The housing comprises a mold material or otherwise optically opaque material, for example. The term "optically opaque" refers to an opacity to electromagnetic radiation, such as light with a wavelength within an emission wavelength range of the optical emitter. "Opaque" may further include opacity for infrared, visible and/or ultraviolet radiation, for example. Generally, hereinafter the expression "light" refers to electromagnetic radiation in the visible, infrared and ultraviolet spectrum, if not stated otherwise. Typically, both the material of the housing and a material of the carrier are opaque with respect to the emission of the optical emitter. However, the materials may attenuate incident light rather than completely blocking it.

Furthermore, the first and second chambers are translucent or transparent at least for light with a wavelength within the emission wavelength range of the optical emitter, if not stated otherwise. The first and second chambers may be filled with an optically transparent or translucent material, such as a mold material. However, the chambers could also not be filled with any material and only contain air.

The housing is arranged on the carrier such that the optical emitter is located inside the first chamber, the main detector is located inside the second chamber and the reference detector is located outside the first chamber. Furthermore, the main surface of the cover section is located opposite to the carrier.

The term "inside" is used to indicate that the respective component has at least one surface that is in contact or open to a volume enclosed by one of the chambers. For example, the optical emitter may be arranged in or on the carrier. When arranged on the carrier, the optical emitter extends into a volume enclosed by the chamber and is considered inside the chamber. When arranged in the carrier, the optical emitter at least has one surface, such as its active surface, that is in contact to the volume enclosed by the chamber. In both cases the emitter is considered inside the chamber.

The term "outside", however, is used to indicate that the respective component is not inside the volume enclosed by a chamber. Said component may, however, be arranged inside the other chamber. Furthermore, said component may also be arranged inside the carrier, or embedded in the carrier, but without having any surface open to or in contact to a chamber volume. For example, the reference detector may be arranged in the carrier and below the optical emitter. In this case the reference detector may be considered outside and below the second chamber.

The optical emitter is arranged and configured to emit light through a first aperture in the cover section. Furthermore, the main detector is arranged and configured to detect light entering the second chamber through a second aperture in the cover section.

In operation the optical emitter emits light which eventually illuminates a target outside the optical sensor module. Typically, the emission is modulated. For example, the optical emitter can be pulsed or modulated by a continuous wave, such as a sinusoid or square wave. In case the target is located in the field of view of the optical sensor module light may be reflected back towards the module and eventually enters into the second chamber via the second aperture. The main detector generates a measurement signal which is indicative of the intensity of reflected light. The optical path connecting the optical emitter with the main detector via the target will be denoted a measurement path hereinafter.

Furthermore, inside the optical sensor module a reference path is established between the optical emitter and the reference detector. The reference path is confined by the main surface of the cover section and the carrier.

In other words, light traversing along the reference path does not leave the housing but remains inside a volume confined by the main surface of the cover section and an outer surface of the carrier. Nevertheless, the reference path may, at least in parts, run through the cover section and/or inside the carrier material. For example, light may be attenuated when traversing along the reference path. In case the optical sensor module comprises a cover glass connected to the main surface the reference path does not run via the glass but remains below the main surface. In fact, the cover glass is not considered a part of the housing but rather arranged on the housing.

During operation of the optical sensor module the reference detector may detect a reference signal indicative of light traversing along the reference path. Thus, the optical sensor module may provide two signals, i.e. the measurement signal and the reference signal. These two signals determine a phase shift between illumination of and reflection at the target. For example, the reference signal determines a time stamp or start time of emission and the measurement signal determines another time stamp or stop time of reflection. The phase shift, or difference between start and stop times, indicates the time-of-flight of light traversing towards the target and, in turn, can be translated into distance. In general, necessary signal processing can be executed on-chip by means of components integrated into the optical sensor module or by other means being external to the optical sensor module.

The proposed optical sensor module allows for significantly reducing package costs when compared to state of the art systems. For example, a compact form factor can be realized as the reference path resides inside the module. At the same time crosstalk is reduced which leads to improved accuracy of time-of-flight measurements. In fact, due to the arrangement of the optical emitter in the first chamber, the main detector inside the second chamber and the reference detector outside the first chamber, unwanted optical crosstalk from the optical emitter to the detectors, such as the main detector, and light leakage between the chambers may be reduced. This allows for an improved precision of the determined start and/or stop time and consequently of the TOF.

The apertures can be defined by openings in the cover section. Sizes and locations of these apertures may be controlled precisely, for example by means of a lithographic structuring process or by means of a molding process on the cover section. For example, lithographic structuring can be used to achieve smaller feature sizes and could be more accurately define the apertures when compared to a molding process. Consequently, the reference and measurement paths can be fine-tuned and intensity, position and/or direction of light beams in the optical sensor module can be controlled in a more accurate way. This may further reduce undesired optical crosstalk between the optical emitter and the main detector and thus improve the precision of the measurement.

In at least one embodiment the first and the second aperture both lie within an emission volume or emission cone of the optical emitter. Therein, the emission volume or cone includes all points in space that may, at least theoretically, be illuminated by the emitter, e.g. for a fixed emitter position and orientation within the optical sensor module.

In at least one embodiment the housing, the optical emitter and the reference detector are arranged such that at least a fraction of light to be emitted by the optical emitter reaches the reference detector when traveling along the reference path. This fraction of light can be detected by the reference detector by generating the reference signal.

In at least one embodiment the main detector and/or the reference detector comprises a single photon avalanche diode, or SPAD for short. The main detector and/or the reference detector may also comprise an array of SPADs.

In at least one embodiment the optical emitter comprises a vertical cavity surface emitting laser, or VCSEL for short. Alternatively, the optical emitter comprises a vertical external cavity surface emitting laser, VECSEL for short. Both lasers types are configured to emit light. For example, emission can be pulsed or in a modulated continuous wave, such as a sinusoid or square wave.

In at least one embodiment the reference detector and the measurement detector are combined into a single detector. For example, the single detector can be integrated into a single die and different regions of interest can be defined on the same detector to distinguish a measurement signal from a reference signal. Different read-out sequences can be established to separately read out the measurement and reference signals. Alternatively, in at least one embodiment the reference detector and the measurement detector are implemented as separate detectors. For example, the detector can be separated specially or be integrated into a common die but are electrically distinguishable entities.

In at least one embodiment a front side of the optical emitter faces the main surface of the cover section. A backside of the optical emitter faces the carrier. The reference detector is arranged below the backside of the optical emitter. At least a fraction of light emitted by the optical emitter is emitted via the backside.

For example, optical emitters like VCSEL or VECSEL are surface emitters and emit light predominantly via an active surface which is denoted their front side. However, some emission occurs also via their backside. This feature can be used to establish the reference path between the backside of the optical emitter and by arranging the reference detector directly below the emitter. In this case the optical emitter may be embedded in the carrier or integrated into an integrated circuit arranged on the carrier. The reference path and the reference detector may thus be located outside the first chamber and shielded from stray light due to the encircling material.

In at least one embodiment the reference path, at least partially, runs inside the carrier. Light emitted by the optical emitter travels towards the reference detector along the reference path and through the carrier.

In operation, light is coupled into the carrier and is attenuated along the reference path. Even though the carrier material may be opaque there may be some transmission of the emission of the optical emitter. For example, silicon as a carrier material has non zero transmission in the infrared. Attenuation due to reference path in or through the carrier has the benefit to loosen requirements on additional filters, such as optical density (OD) filters. In some embodiments it may even be possible to dispense any additional filters. Furthermore, by using the carrier, or parts thereof, as reference path renders the overall design of the optical module less complex, and, thus, less costly to manufacture.

In at least one embodiment the reference path at least partially runs through a waveguide. The waveguide is arranged between the cover section and the carrier.

For example, the waveguide is a one- or two-dimensional structure arranged into the housing. In general, the waveguide is a structure that guides electromagnetic radiation along its dimensions. For example, the waveguide may comprise a dielectric material with high permittivity, and thus high index of refraction, and may be surrounded by the material of the housing with lower permittivity. The waveguide guides light by total internal reflection. One possibility is to arrange the waveguide into a gap between the light barrier and the carrier or arrange the gap into the light barrier. Thus, the waveguide connects the first and second chambers, for example.

In at least one embodiment the light barrier is designed as an optical power limiter. The light barrier confines the reference path such that light emitted by the optical emitter and along the reference path towards the reference detector is attenuated when running past the light barrier.

The light barrier is arranged to block light, e.g. the emission from the optical emitter, from reaching the detectors. As such the light barrier is a means to reduce optical crosstalk in the optical sensor module. However, depending on the material or design of the light barrier a certain amount of light might leak through and eventually gets detected by one or both of the detectors. For example, the material of the housing could have some transmission in the infrared, or the light barrier leaves a small gap between the first and second chambers. However, the light barrier by choice of material and/or design can be arranged to at least attenuate light, i.e. light is optically limited in power. This way light traversing along the reference path may be distinguished from light travelling along the measurement path.

In at least one embodiment the light barrier comprises a gap which serves as optical power limiter. In fact, the light barrier confines the gap between the cover section and the carrier. The gap confines the reference path such that only a fraction of light may pass through and eventually reach the reference detector. Thus, light traversing along the reference path is attenuated, i.e. is optically limited in power.

In at least one embodiment the light barrier comprises a meander structure as optical power limiter. The meander structure has a set of interdigitated fingers (IF). The set of interdigitated fingers comprises at least one finger connected to the housing and at least one finger connected to the carrier. Thus, the meander structure splits into two parts, one connected to the housing and one connected to the carrier. Thus, the two parts do not necessarily have to be in contact.

The meander structure with the set of interdigitated fingers attenuates light, or optically limits power of light, traversing along the reference path. Thus, the meander reduces optical crosstalk and supports improved measurement accuracy. Furthermore, the meander provides a design option which decouples the housing, e.g. the light barrier, from the carrier. In other words, there may be no direct connection between the light barrier and the carrier due to the interdigitated fingers. This improves stability of the optical sensor module which may be less prone to damage under mechanical stress. Furthermore, no additional connection needs to be provided between the light barrier and the carrier which renders manufacture of the module less complex and, thus, less costly.

In at least one embodiment a cover glass is arranged on the main surface of the cover section leaving a gap between the cover glass and the cover section. An additional reference path is established between the optical emitter and the reference detector. The additional reference path runs via the gap between the cover glass and the cover section.

In at least one embodiment the housing comprises a frame body. The frame body laterally confines the first and second chambers. The cover section, frame body and the light barrier are comprised by a continuous piece of material.

For example, the frame body and the light barrier may not fabricated separately and connected to each other in a separate process step, such as for example by an adhesive. Consequently, undesired leakage of light between the first and the second chamber at interfaces between the light barrier and the frame body may be avoided.

In at least one embodiment the optical sensor module further comprises a measurement unit. The main detector is configured to generate a measurement signal in response to light detected by the main detector. The reference detector is configured to generate a reference signal in response to light detected by the reference detector. The measurement unit is configured to compute a time-of-flight value depending on the measurement signal and the reference signal.

For example, the measurement unit is configured to compute the start time $t_1$ depending on the reference signal and the stop time $t_2$ depending on the measurement signal. The time-of-flight value $t_{TOF}$ is given by the difference $t_{TOF}=t_2-t_1$.

In at least one embodiment, the measurement unit is configured to compute the time-of-flight value according to the difference $t_{TOF}=t_2-t_1-t_{off}$, wherein $t_{off}$ represents an offset time taking into account a length of the reference path $d_{ref}$ given as $t_{off}=d_{ref}/c$, with c being the speed of light.

In at least one embodiment the measurement unit, the main detector and the reference detector are integrated into a single semiconductor die. For example, the single integrated circuit comprises the measurement unit having some or all of the following components: a time-to-digital converter, a processing CPU for signal processing, such as a micro-controller, volatile and/or non-volatile memory and a driver circuit. Typically, the light source, such as the VCSEL laser diode, is connected to the integrated circuit and the integrated circuit only comprises the driver circuit. However, the single integrated circuit may also comprise the light source itself if this component can be integrated, by means of a CMOS process, for example.

In at least one embodiment, the optical sensor module comprises one or more emitter lenses for focusing light emitted by the optical emitter and/or one or more detector lenses for focusing light entering the second chamber. The respective lenses may be arranged in or near the apertures in the chambers. The emitter lens is arranged above, e.g. directly above, the optical emitter on a side of the housing facing the optical emitter, for example. For example, the emitter lens may cover the first aperture. The detector lens is arranged above, e.g. directly above, the main detector on a side of the housing facing the main detector, for example. For example, the detector lens may cover the second aperture.

In at least one embodiment, the cover glass is implemented as a transparent glass plate or plastic plate.

In at least one embodiment a method for manufacturing an optical sensor module for time-of-flight measurement comprises the following steps.

An optical emitter, a main detector and a reference detector are arranged in or on the carrier. An opaque housing is provided having a cover section. Said housing is separated into the first chamber and a second chamber by means of a light barrier.

The housing is arranged on the carrier such that the optical emitter is located inside the first chamber, the main detectors is located inside the second chamber and the reference detector is located outside the first chamber. Furthermore, the housing on the carrier is arranged such that a main surface of the cover section is opposite to the carrier.

Furthermore, first and second apertures are provided in the cover section of the housing. The optical emitter is arranged and configured to emit light through the first aperture in the cover section. The main detector is arranged and configured to detect light entering the second chamber through the second aperture in the cover section.

Finally, a reference path is established between the optical emitter and the reference detector inside the optical sensor module. The reference path is confined by the main surface of the cover section and by the carrier.

Further embodiments of the method are readily derived from the various embodiments of the optical sensor module and vice versa.

In the following, the principle presented above is described in further detail with respect to drawings, in which exemplary embodiments are presented.

In the exemplary embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

DETAILED DESCRIPTION

Figure 1A:
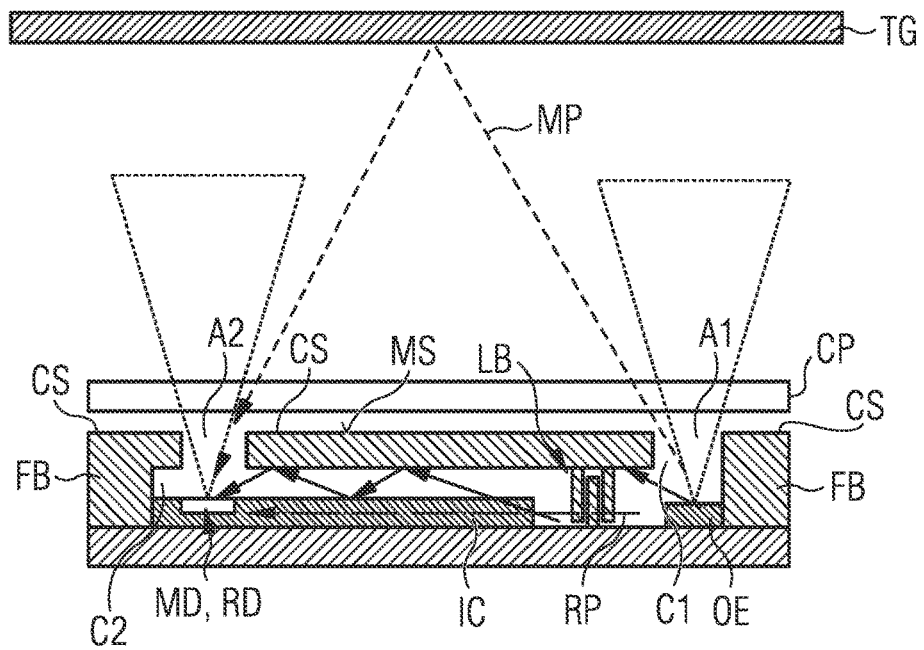
FIGS. 1A to 1C show an exemplary embodiment of an optical sensor module with a meander structured light barrier.
Figure 1B:
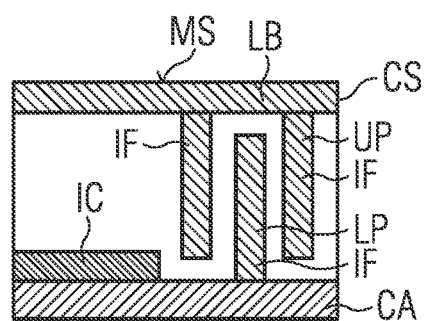
Figure 1C:
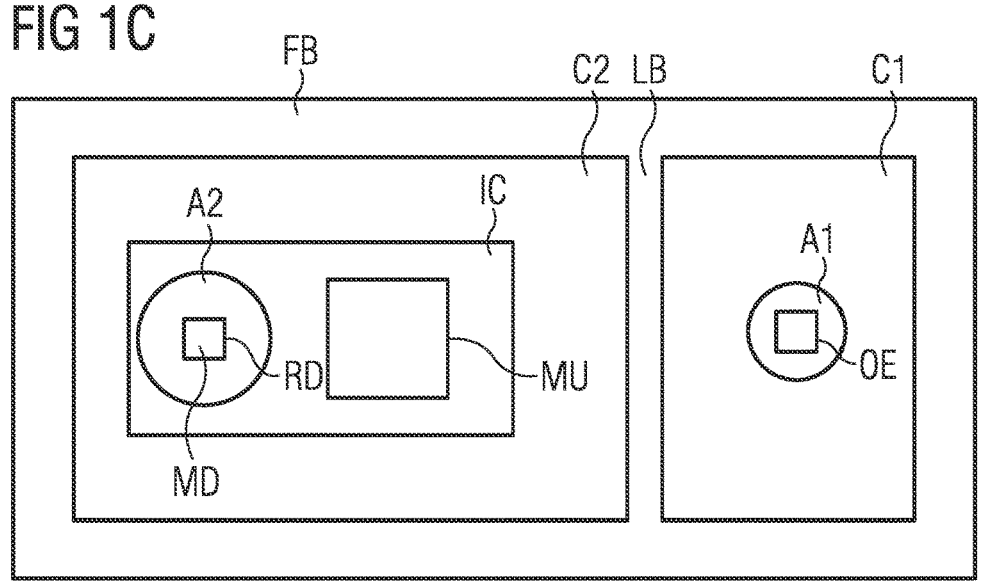

FIGS. 1A to 1C show an exemplary embodiment of an optical sensor module with a meander structured light barrier.

FIG. 1A shows a side view of the optical sensor module with the meander structured light barrier LB.

The module comprises a carrier CA and an opaque housing arranged on the carrier. The housing comprises a light barrier LB which divides the housing into a first and a second chamber C1, C2. The first and second chambers C1, C2 are further confined laterally by a frame body FB arranged in the housing. A cover section CS is located opposite to the carrier CA and thereby covers the chambers C1, C2. The cover section CS has a main surface MS which essentially is parallel to a main surface of the carrier CA. The cover section CS, frame body FB, and light barrier LB are manufactured are all comprised by a continuous piece of material, such as a mold material, for example. The light barrier LB comprises a meander structure of interdigitated fingers which are partly connected to the carrier CA and partly to the housing, respectively. The meander structure will be discussed in more detail in FIG. 1B.

The carrier CA provides mechanical support and electrical connectivity to electronic components integrated into the optical sensor module. For example, in this embodiment the carrier CA comprises a printed circuit board (PCB). However, in other embodiments (not shown) the carrier CA can also be part of the housing, e.g. as a section in the continuous piece of material mentioned above, e.g. a mold material, and electronic components are embedded into the housing.

An optical emitter OE is located inside the first chamber C1. In this particular embodiment, the optical emitter OE is arranged on and electrically connected to the carrier CA, e.g. to the PCB. The optical emitter OE is a laser diode such as a VCSEL or VECSEL. These types of lasers are configured to emit light in the infrared part of the electromagnetic spectrum.

A main detector MD and a reference detector RD are arranged inside the second cavity C2, for example arranged on the carrier CA. In this particular embodiment, the detectors MD, RD are integrated into a single detector die, such as a single semiconductor integrated circuit manufactured in a CMOS process. The detectors MD, RD can be realized as a reference SPAD array and a measurement SPAD array which are combined into a single SPAD array that can be used for measurement of an optical reference signal and a measurement signal (see below), respectively.

First and second apertures A1, A2 are arranged into the cover section CS. The first and the second apertures A1, A2 are positioned above the optical emitter OE and the main detector MD, respectively. In fact, the apertures A1, A2 lie within an emission cone of the optical emitter OE and a field of view of the main detector MD, respectively. Therein, the emission cone includes all points in space that may, at least theoretically, be illuminated by the optical emitter OE, e.g. for a fixed emitter position and orientation within the optical sensor module. Similarly, the field of view of the main detector MD includes all points in space from where, at least theoretically, light after reflection at an external target TG may traverse towards the main detector MD, e.g. for a fixed detector position and orientation within the optical sensor module.

The optical sensor module is, optionally, covered by an optically transparent or translucent cover plate CP, for example made of glass or a plastic material. The cover plate CP typically is part of a larger device such as mobile device into which the optical sensor module is integrated. For design reasons the cover plate CP may be provided with a layer LY of material which is distributed on an inner main surface SI of the cover plate CP, including for example an optically opaque coating OC. The optically opaque coating OC can be implemented as an ink coating, such as a black ink coating.

In operation, the optical emitter OE emits light having an emission wavelength or emission spectrum in the IR or UV/vis. In many applications infrared emission is preferred as it is invisible to human sight. Optical emitters include vertical-cavity surface-emitting lasers, VCSEL, or vertical-external-cavity surface-emitting-lasers, VECSEL, which predominantly emit in the IR. The emission of the optical emitter OE typically is modulated, e.g. emission is pulsed or modulated by a continuous wave, such as a sinusoid or square wave. For example, pulses may have a frequency in the kHz range, for example 80 kHz.

The optical emitter OE is located inside the housing such that at least a fraction of emitted light leaves the module via the first aperture A1. This fraction of light (denoted measurement fraction) eventually gets, at least partially, reflected by an external object or target TG. The main detector MD is located in the module such that reflected light may enter the second cavity C2 by way of the second aperture A2 and, consequently, be detected by the main detector MD. The main detector MD generates a measurement signal in response to the detected light. The optical path connecting the optical emitter OE with the main detector MD by way of the target TG establishes a measurement path MP and the light traversing along the measurement path forms a measurement beam MR of light.

In addition, a reference path RP is established in the optical sensor module and optically connects the optical emitter OE with the reference detector RD without running via any external target. Consequently, another fraction, denoted a reference fraction hereinafter, traverses along the reference path and forms a reference beam RB of light. The light of the reference beam RB is at least partly detected by the reference detector RD which, in turn, generates a reference signal based on the detected light. The measurement and reference signals are measures of the time-of-flight characteristic of the measurement path, and can be translated into distance (between the module and the target). Signal processing and time-of-flight calculation are performed in a measurement unit MU which in this particular embodiment is integrated together with other components into an integrated circuit IC made from the same semiconductor die SD and comprises the main and reference detectors MD, RD. Further details will be discussed with respect to FIGS. 6A to 6C.

FIG. 1B shows the meander structure of interdigitated fingers in more detail. The meander structure splits into two parts, an upper part UP connected to the housing and a lower part LP connected to the carrier CA. Each part comprises at least one finger and the fingers are arranged in an interdigitated fashion. Thus, the two parts and the interdigitated fingers are not in contact and, thus, in the range of the light barrier LB decouple the housing and the carrier CA from each other.

The meander structure is part of the reference path RP and functions as an optical power limiter, i.e. it confines the reference path RP such that the reference beam RB is attenuated when running past the light barrier LB and meander structure. The meander structure is added as optical power limiter in order to prevent crosstalk from saturating the reference and main detector MD, RD.

In another embodiment (not shown) instead of, or in addition to, having a meander structure, the light barrier LB comprises a gap GP as optical power limiter and confines this gap between the cover section CS and the carrier CA. In this case the reference beam needs to run through the gap GP and gets attenuated on the way as well. Nonetheless the gap GP provides a well-defined optical path as optical power limiter in order to prevent crosstalk from saturating the reference and main detector MD, RD.

FIG. 1C shows a top view of the optical sensor module. The cover section CS in this drawing is only hinted at by showing the first and second apertures A1, A2 as circles. The optical emitter OE is centered with respect to the first aperture A1 and arranged in the first chamber C1. The main detector MD together with the reference detector RD are centered with respect to the second aperture A2. Together with the measurement unit MU the detectors are integrated into the same semiconductor die SD as integrated circuit IC. The integrated circuit IC is arranged in the second chamber C2. The detectors MD, RD and the optical emitter OE are located in a common plane perpendicular to the carrier CA, i.e. main surface MS of the carrier CA.

Figure 2:
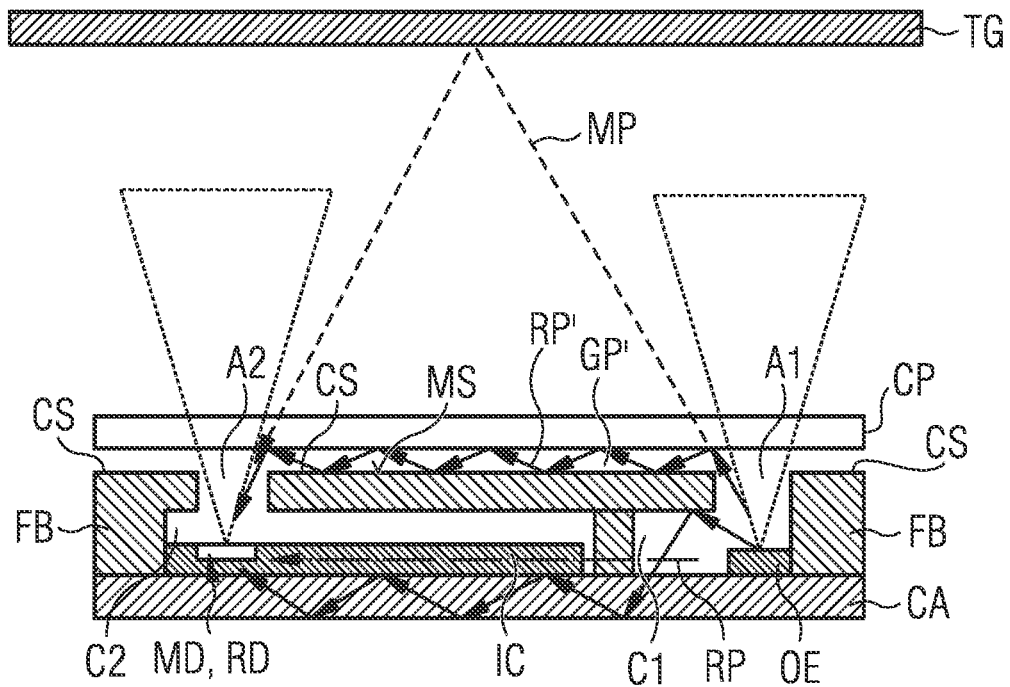
FIG. 2 shows another exemplary embodiment of an optical sensor module with a reference path running through the carrier.

FIG. 2 shows another exemplary embodiment of an optical sensor module with a reference path RP running through the carrier CA. The overall design of the optical sensor module is based on the one explained in FIGS. 1A to 1C. However, the light barrier LB can be designed as a structural feature connecting the housing with the carrier CA instead of a meander structure.

Furthermore, the reference path RP at least partially runs through the carrier CA. For example, in case the carrier CA comprises a substrate or printed circuit board, the carrier material is somewhat transparent to the emission of the optical emitter OE to guide crosstalk to the reference detector RD through the substrate or PCB. For example, silicon as carrier material has some transmission for infrared light. At the same time, light traversing through the carrier CA is attenuated in order not to saturate the detectors.

Similar to FIGS. 1A to 1C the optical sensor module is positioned below a cover plate CP, e.g. arranged on the main surface MS of the cover section CS, leaving a gap between the cover plate CP and the cover section CS. The gap gives room for an additional reference path RP' which optically connects the optical emitter OE and the reference detector RD by guiding emitted light via another gap GP' between the cover plate CP and the cover section CS. The additional reference path RP' gives rise to another reference beam which can be used for TOF measurement.

Figure 3:
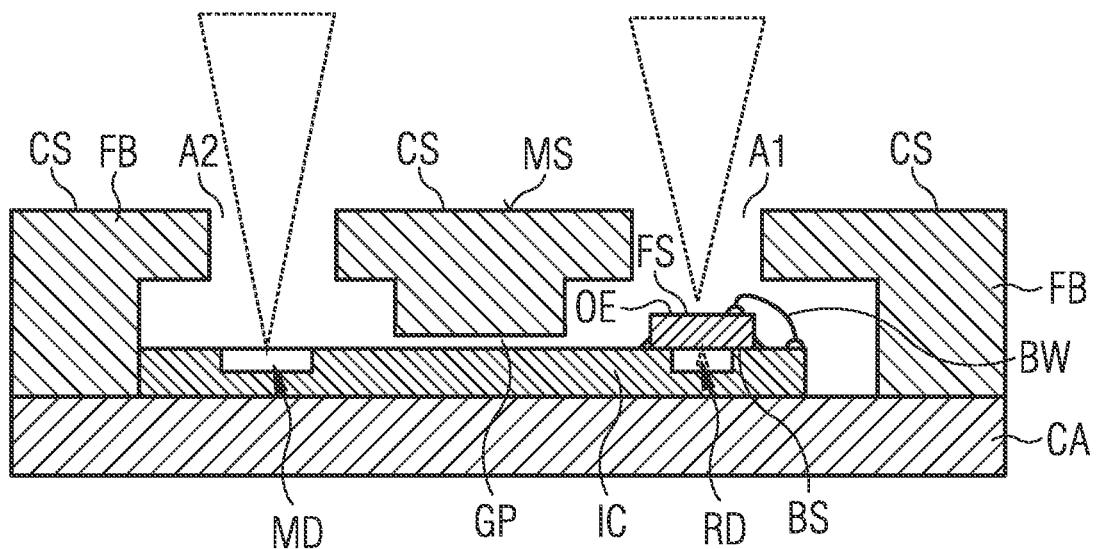
FIG. 3 shows another exemplary embodiment of an optical sensor module with a stack from the main and reference detector.

FIG. 3 shows another exemplary embodiment of an optical sensor module having a stack from the main and reference detector MD, RD. The overall design of this optical sensor module is again based on the ones presented in the previous Figures. The light barrier LB leaves a gap GP between the carrier CA (or integrated circuit IC) and to the housing. Thus, at least in the range of the light barrier LB on the housing is not in contact with the carrier CA or integrated circuit IC. Furthermore, the integrated circuit IC comprising the main detector MD, the reference detector RD and the optical emitter OE spans along the carrier CA and is located in both first and second chambers C1, C2.

The optical emitter OE has a front side FS facing into the first chamber C1 and towards the first aperture A1. The optical emitter OE also has a backside BS which faces towards the carrier CA. The optical emitter OE is connected to the integrated circuit IC via its backside BS. Just below the backside BS of the optical emitter OE the reference detector RD is stacked with the optical emitter OE and thereby integrated into the integrated circuit IC and located outside the first chamber C1. In fact, an active surface of the reference detector RD is completely covered by the backside BS of the optical emitter OE when viewed from above (i.e. from a direction perpendicular to the main surface of the carrier CA).

Some optical emitters OE, such as a VCSEL laser diodes, are known to emit a small amount of photons via their backside BS. In this embodiment, the VCSEL is stacked directly above the reference detector RD, e.g. as a reference SPAD array. It therefore protects the reference detector RD from sunlight. The backside BS emitting photons accumulate and establishes the reference beam and can be detected by the reference detector RD (or reference SPAD array) which leads to a high signal to noise ratio, for example as seen in a histogram of the reference SPAD array (see FIG. 6C). The reference path RP is established within the stack comprising the optical emitter OE and the reference detector RD.

Figure 4:
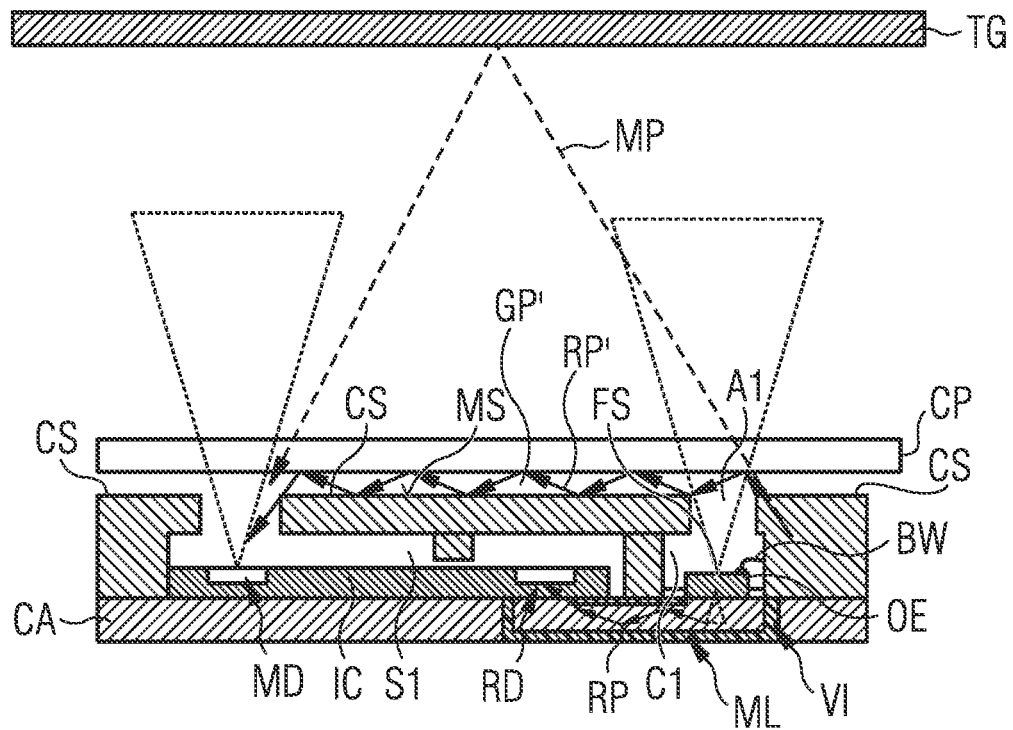
FIG. 4 shows another exemplary embodiment of an optical sensor module with a reference path running through the carrier.

FIG. 4 shows another exemplary embodiment of an optical sensor module with a reference path RP running through the carrier CA. This embodiment is partly similar to the one presented in FIG. 3 and partly to the one presented in FIG. 2.

For example, the light barrier LB separates the housing into the first and second chamber C1, C2. The light barrier LB is in contact, or part of, the housing and is connected with the carrier CA. Thus, there is no gap between the light barrier LB and the carrier CA. The first chamber C1, however, only comprises the optical emitter OE and the reference detector RD is located outside the first chamber C1. The second chamber C2 is divided into two sub-chambers by means of an additional light barrier LB' which is similar to the light barrier LB of FIG. 3. A first sub-chamber S1 comprises the main detector MD and a second sub-chamber S2 comprises the reference detector RD.

The additional light barrier LB' leaves a gap GP between the carrier CA (or integrated circuit IC) and the housing. Thus, at least in the range of the additional light barrier LB' the housing is not in contact with the carrier CA or integrated circuit IC. Furthermore, the integrated circuit IC comprising the main detector MD and the reference detector RD spans along the carrier CA and is located in both the first and second sub-chambers S1, S2.

In a modification of this embodiment, the additional light barrier LB' may also comprise, or be complemented with, a meander structure as the one presented in FIGS. 1A to 1C. Furthermore, the optical emitter OE features backside emission and, similar to the embodiment of FIG. 2, the reference path RP, at least partially, runs through the carrier CA, such as the substrate or PCB. The reference path RP in this embodiment is further complemented with one or more metal layers ML and/or vias VI of the carrier substrate or PCB which are arranged on surfaces of the carrier CA. This allows to separate the die from the optical emitter OE, such as a VCSEL. This approach is supported by a modified design of the optical emitter OE with two bonding wires BW on its topside in order to prevent the bottom side from being covered by metal layer in the manufacturing process.

Figure 5:
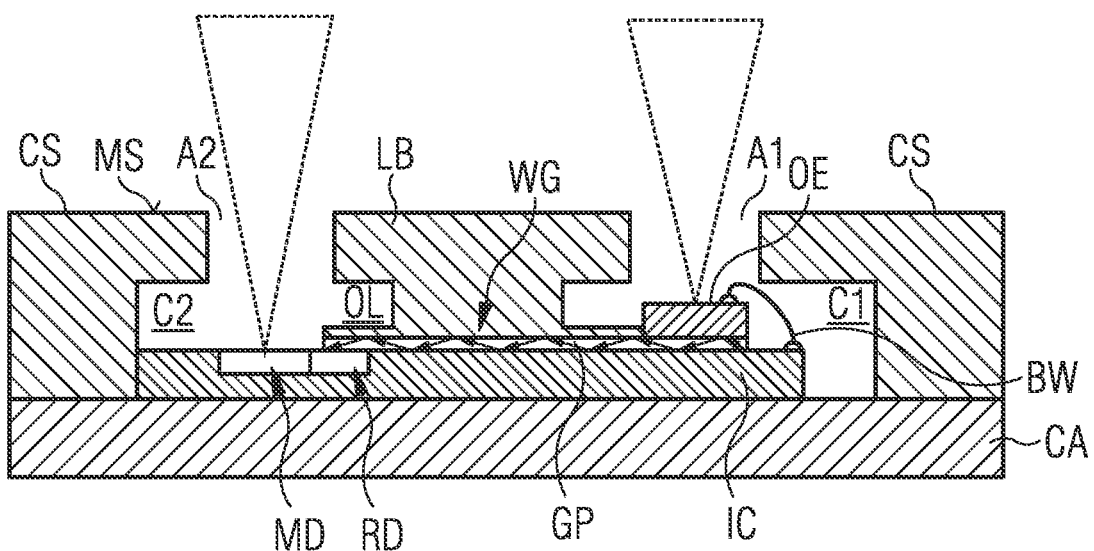
FIG. 5 shows another exemplary embodiment of an optical sensor module with a waveguide.

FIG. 5 shows another exemplary embodiment of an optical sensor module with a waveguide WG. The embodiment is based on FIG. 3 and shows another approach with a backside emitting optical emitter OE, such as a VCSEL laser diode.

A waveguide WG is placed in the gap GP of the light barrier LB between the carrier CA, integrated circuit IC and the housing. The waveguide WG connects the first and second chambers C1, C2. Furthermore, the waveguide WG has an overlap OL which extends over the reference detector RD and thereby covers the reference detector RD from sunlight. The main detector MD and reference detector can be implemented as a single detector or located on or in the integrated circuit IC right next to each other. In other words, the waveguide WG is arranged on a surface of the integrated circuit IC.

In operation photons are emitted via the backside BS of the optical emitter and are guided through the waveguide WG to the reference detector RD located next to the main detector MD. A VCSEL could be mounted on the integrated circuit IC, on top of waveguide WG. The waveguide WG would carry signal across the integrated circuit IC and have the main and reference detectors MD, RD can all be placed in the same area. The waveguide WG also blocks other light and transmit paths, and only sees reference path RP. This makes chip floorplan (timing) better as all the detectors, e.g. SPADs, can be located next to each other.

Figure 6A:
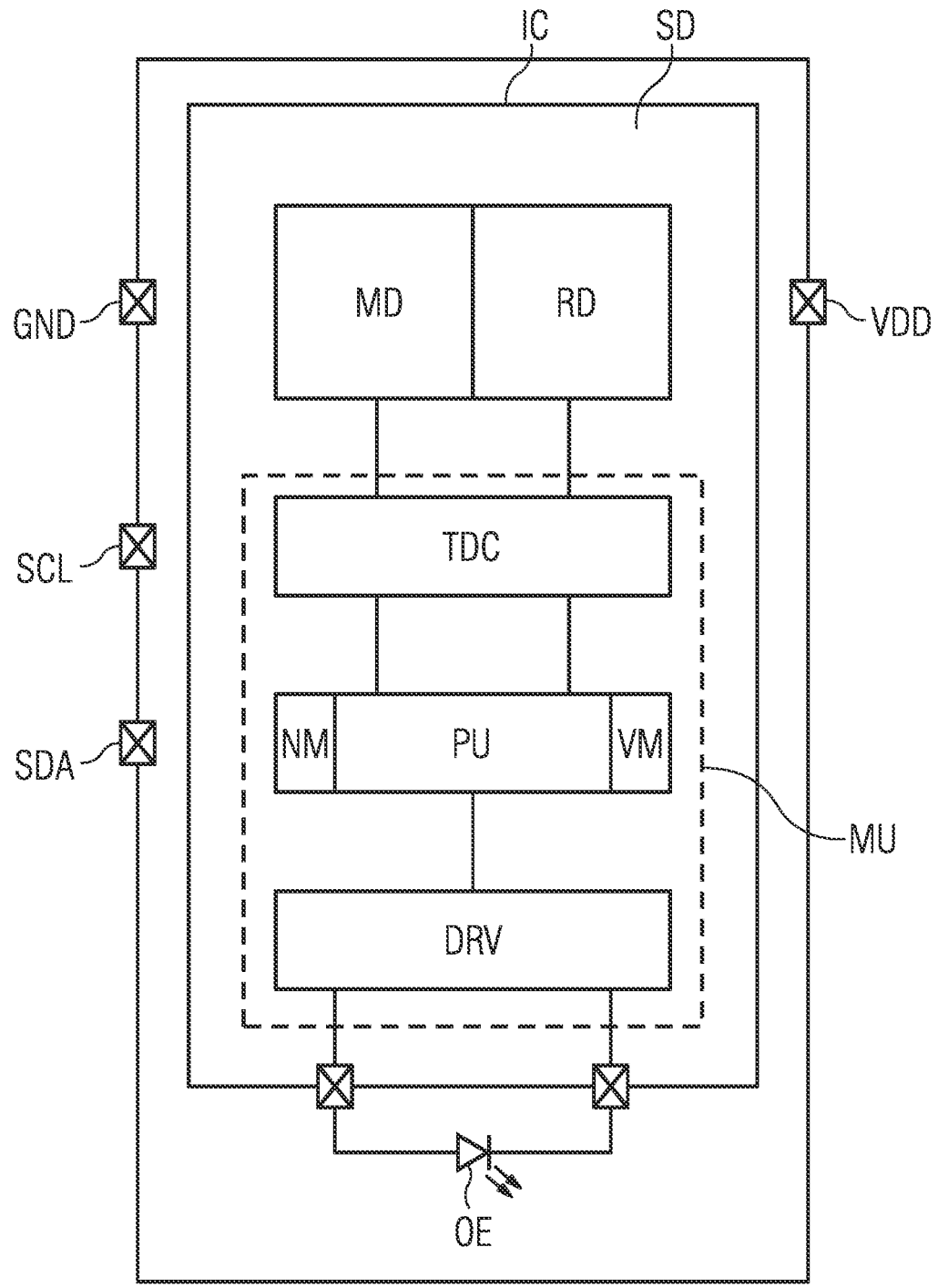
FIGS. 6A to 6C show an exemplary embodiment of an optical sensor module with a measurement unit.
Figure 6B:
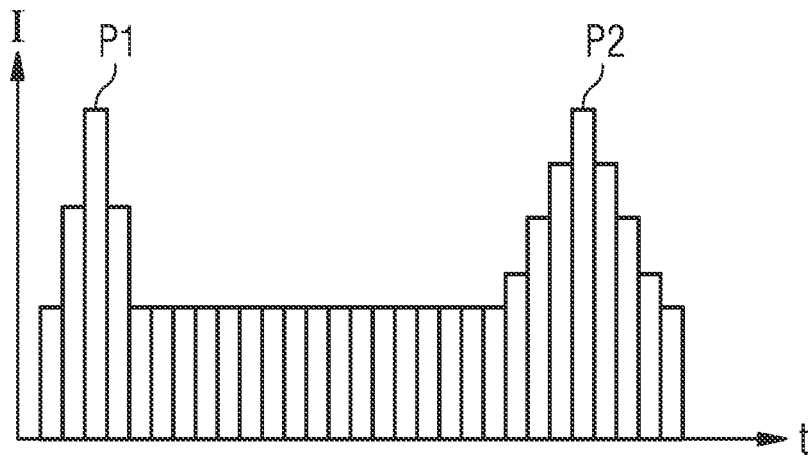
Figure 6C:
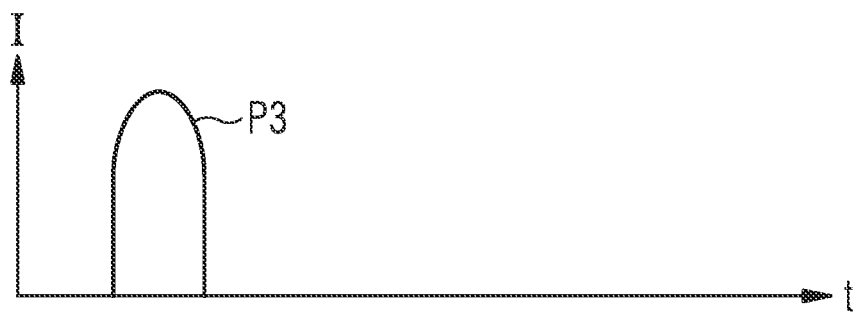
Figure 6C:
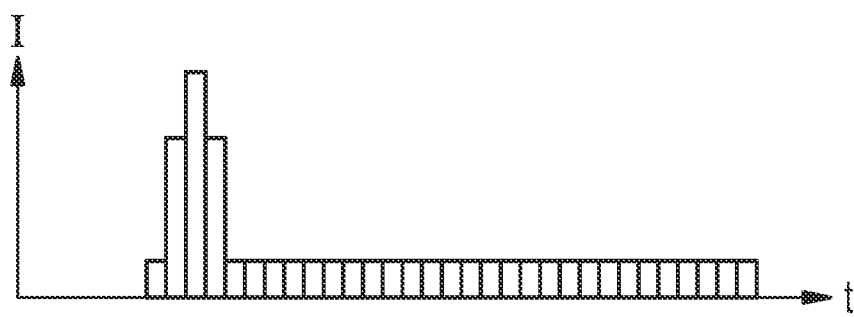
Figure 6C:
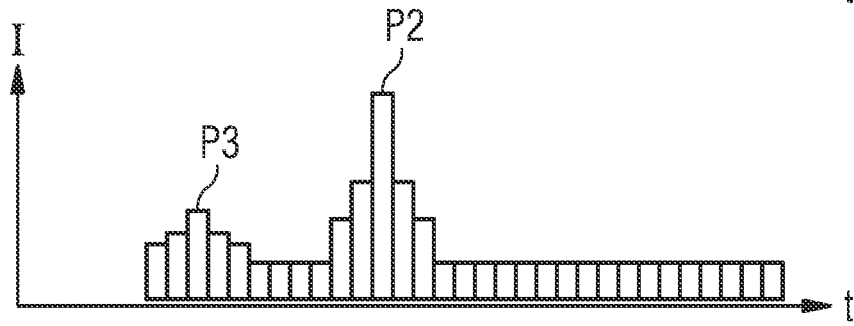

FIGS. 6A to 6C show an exemplary embodiment of an optical sensor module with a measurement unit. The measurement unit comprises several components in order to run and orchestrate a time-of-flight measurement using the optical sensor module. In fact, all embodiments presented this far share the same, or similar, operation principle which will be discussed in the following.

FIG. 6A shows the optical sensor module without its housing. The module is based on the carrier CA as discussed above. In this exemplary embodiment the carrier comprises a substrate and printed circuit board PCB. The PCB has several terminals in order to electrically contact its components. For example, terminals GND, VDD, and SDA, SCL are arranged for power supply and communication with the module, respectively. The integrated circuit IC is connected with the printed circuit board and the various terminals.

The integrated circuit IC comprises the measurement unit MU, the main detector MD and the reference detector RD, i.e. all are integrated into a single semiconductor die SD. For example, the main detector MD and/or the reference detector RD comprises a single-photon avalanche diode, SPAD, or an array of SPADs.

The measurement unit MU comprises a time-to-digital converter TDC, a processing unit PU for signal processing, such as a micro-controller, volatile VM and/or non-volatile memory NM and a driver circuit DR. The interplay of these components enables the measurement unit MU to conduct a time-of-flight measurement as will be discussed in further detail below.

Typically, the optical emitter OE comprise a vertical-cavity surface-emitting laser, VCSEL, or a vertical-external-cavity surface-emitting-laser, VECSEL. These components can be integrated into the integrated circuit IC but often it is more economical to connect them to the integrated circuit IC externally as shown in the drawing. For example, the optical emitter OE is connected to its driver circuit DR, which is part, i.e. integrated into, the integrated circuit IC, and accessed via driver terminals D1, D2.

The measurement unit MU receives the measurement signal from the main detector MD and the reference signal from the reference detector RD. For example, these signals are converted into corresponding digital signals, respectively, by means of one or more time-to-digital converters TDC. These digital signals may be saved or accumulated into the memory for subsequent signal processing. Timing and control of detectors and the optical emitter OE is controlled by the measurement unit MU as well, e.g. by synchronizing detection and emission by means of driver circuit DR.

The processing unit PU or micro-controller conducts the time-of-flight measurement. For example, the processing unit PU is configured to determine a start time $t_1$ of emission from the arrival of the reference signal and determine a stop time $t_2$ of emission from the arrival of the measurement signal. The time-of-flight value $t_{TOF}$ is given by the difference $$t_{TOF}=t_2-t_1.$$

The processing unit PU can also account for an offset time taking into account a length of the reference path $d_{ref}$ given as $t_{off}=d_{ref}/c$, with c being the speed of light. Then the time-of-flight value yields $$t_{TOF}=t_2-t_1-t_{off}.$$

Once the time-of-flight value has been determined it can be translated into a distance value which indicates the distance between the optical sensor module and the target TG.

In a pulsed operation the optical emitter OE illuminated the target TG for a brief period of time $\Delta t=t_2-t_1$ and the reflected light is sampled at the pixels of the main detector MD, e.g. SPAD array, for example. This may be achieved by using two windows w1 and w2 which are out of phase with the same period of time $t_2-t_1$. Electrical charges accumulated during these windows give rise to two measurement signals M1 and M2. The distance value d is given by:

$$d=\tfrac{1}{2}c\Delta t(M2/M1+M2).$$

Measurement of time difference $\Delta t$ is facilitated by the accumulation of histograms shown in FIGS. 6B and 6C. FIG. 6B shows a typical histogram of a single detector package, e.g. the one depicted in FIGS. 1A to 1C. The histogram, i.e. intensity distribution I over time t, shows a reference peak P1 and a measurement peak P2. FIG. 6C shows a measurement and a reference histogram of a stacked VCSEL approach. The reference SPAD array contains a very well defined reference peak P1 and nearly no background noise. The diagram on the top shows an emission peak P3, the diagram in the middle shows another reference peak for comparison only.

The invention claimed is:

1. An optical sensor module for time-of-flight measurement, having an optical emitter, a main detector and a reference detector arranged in or on a carrier, further comprising:
   an opaque housing with a first chamber and a second chamber, separated by a light barrier and having a cover section; wherein the housing is arranged on the carrier such that
   the optical emitter is located inside the first chamber, the main detector is located inside the second chamber, the reference detector is located outside the first chamber, and
   a main surface of the cover section is positioned opposite the carrier; and wherein
   the optical emitter is arranged and configured to emit light through a first aperture in the cover section, and the main detector is arranged and configured to detect light entering the second chamber through a second aperture in the cover section,
   a reference path is established between the optical emitter and the reference detector inside the optical sensor module, and confined by the main surface of the cover section and the carrier, and
   the first chamber and the second chamber each are laterally delimited by the opaque housing.

2. The optical sensor module according to claim 1, wherein the housing, the optical emitter and the reference detector are arranged such that at least a fraction of light to be emitted by the optical emitter along the reference path reaches the reference detector.

3. The optical sensor module according to claim 1, wherein
   the main detector and/or the reference detector comprise a single-photon avalanche diode, SPAD, or an array of SPADs, and/or
   the optical emitter comprise a vertical-cavity surface-emitting laser, VCSEL, or a vertical-external-cavity surface-emitting-laser, VECSEL, configured to emit light.

4. The optical sensor module according to claim 1, wherein
   the reference detector and the main detector are combined into a single detector, or
   the reference detector and the main detector are implemented as separate detectors.

5. The optical sensor module according to claim 1, wherein
   a front side of the optical emitter faces the main surface of the cover section and a backside of the optical emitter faces the carrier,
   the reference detector is arranged below the backside of the optical emitter, and
   a fraction of light emitted by the optical emitter is emitted via the backside of the optical emitter.

6. The optical sensor module according to claim 1, wherein the reference path at least partially runs inside the carrier such that light emitted by the optical emitter along the reference path travels through the carrier towards the reference detector.

7. The optical sensor module according to claim 6, wherein the carrier comprises a guiding structure to direct light along the reference path inside the carrier.

8. The optical sensor module according to claim 1, wherein the reference path at least partially runs through a waveguide arranged between the cover section and the carrier.

9. The optical sensor module according to claim 1, wherein the light barrier is designed as an optical power limiter which confines the reference path such that light emitted by the optical emitter along the reference path and towards the reference detector is attenuated when running past the light barrier.

10. The optical sensor module according to claim 9, wherein
    the light barrier comprises a gap as optical power limiter and confines the gap between the cover section and the carrier, and/or
    the light barrier comprises a meander structure as optical power limiter, having a set of interdigitated fingers, wherein the set of interdigitated fingers comprises at least one finger connected to the housing and at least one finger connected to the carrier.

11. The optical sensor module according to claim 1, wherein
- a cover plate is arranged on the main surface of the cover section leaving a gap between the cover plate and the cover section,
- an additional reference path is established between the optical emitter and the reference detector running via the gap between the cover plate and the cover section.

12. The optical sensor module according to claim 1, wherein
- the housing comprises a frame body laterally confining the first and second chambers, and
- the cover section, frame body, and the light barrier are comprised by a continuous piece of material.

13. The optical sensor module according to claim 1, further comprising a measurement unit, wherein
- the main detector is configured to generate a measurement signal in response to light detected by the main detector,
- the reference detector is configured to generate a reference signal in response to light detected by the reference detector, and
- the measurement unit is configured to compute a time-of-flight value depending on the measurement signal and the reference signal.

14. The optical sensor module according to claim 13, wherein the measurement unit the main detector and the reference detector are integrated into a single semiconductor die.

15. The optical sensor module according to claim 1, wherein the reference detector and the main detector are arranged inside the second chamber of the opaque housing.

16. A method for manufacturing an optical sensor module for time-of-flight measurement, the method comprising the steps of:
- arranging an optical emitter, a main detector and a reference detector in or on a carrier,
- providing an opaque housing having a cover section, and a first chamber and a second chamber, wherein the first chamber and the second chamber each are laterally delimited by the opaque housing,
- separating the first chamber and a second chamber by means of a light barrier,
- arrange the housing on the carrier such that the optical emitter is located inside the first chamber, the main detector is located inside the second chamber, and the reference detector is located outside the first chamber, and such that a main surface of the cover section is opposite the carrier; and wherein
- the optical emitter is arranged and configured to emit light through a first aperture in the cover section, and the main detector is arranged and configured to detect light entering the second chamber through a second aperture in the cover section, and
- a reference path is established between the optical emitter and the reference detector inside the optical sensor module, and confined by the main surface of the cover section and by the carrier.

* * * * *